(12) United States Patent
Field

(10) Patent No.: US 6,845,789 B2
(45) Date of Patent: Jan. 25, 2005

(54) HIGH DENSITY FIBER OPTIC CABLE INNER DUCTS

(75) Inventor: Larry W. Field, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 203 days.

(21) Appl. No.: 09/998,510

(22) Filed: Nov. 30, 2001

(65) Prior Publication Data

US 2003/0102043 A1 Jun. 5, 2003

(51) Int. Cl.[7] .................................................. F16L 9/18
(52) U.S. Cl. ....................................... 138/115; 138/111
(58) Field of Search ............................... 138/111, 112, 138/114, 115, 116, 104; 385/134, 101, 106, 110

(56) References Cited

U.S. PATENT DOCUMENTS

| | | | |
|---|---|---|---|
| 9,745 A | * 5/1853 | Lamb | 126/58 |
| 388,442 A | * 8/1888 | Phipps | 285/124.5 |
| 3,941,157 A | * 3/1976 | Barnett | 138/115 |
| 4,038,489 A | * 7/1977 | Stenson et al. | 174/70 R |
| 4,389,088 A | * 6/1983 | Trezequet | 385/111 |
| 4,582,093 A | 4/1986 | Hubbard et al. | 138/111 |
| 4,801,192 A | * 1/1989 | Wehner | 385/101 |
| 4,892,442 A | 1/1990 | Shoffner | 405/154 |
| 5,087,153 A | 2/1992 | Washburn | 405/154 |
| 5,408,562 A | * 4/1995 | Yoshizawa et al. | 385/112 |
| 5,605,419 A | 2/1997 | Reinert, Sr. | 405/154 |
| 5,677,974 A | * 10/1997 | Elms et al. | 385/101 |
| 5,678,609 A | 10/1997 | Washburn | 138/107 |
| 5,692,545 A | 12/1997 | Rodrigue | 138/115 |
| 5,788,414 A | 8/1998 | Gordon | 405/154 |
| 5,848,212 A | * 12/1998 | Wagman | 385/111 |
| 5,971,029 A | 10/1999 | Smith et al. | 138/98 |
| 6,011,887 A | * 1/2000 | Kamei et al. | 385/103 |
| 6,046,404 A | * 4/2000 | Figenschou et al. | 174/47 |
| 6,102,077 A | * 8/2000 | Legallais et al. | 138/115 |
| 6,195,486 B1 | * 2/2001 | Field et al. | 385/100 |
| 6,304,698 B1 | 10/2001 | Morris | 385/100 |
| 6,424,772 B1 | * 7/2002 | Blazer et al. | 385/110 |
| 6,496,628 B1 | * 12/2002 | Opel et al. | 385/110 |
| 6,519,396 B2 | * 2/2003 | Schneider et al. | 385/101 |
| 6,564,831 B1 | * 5/2003 | Sanoner et al. | 138/115 |
| 6,591,046 B2 | * 7/2003 | Stottlemyer | 385/103 |
| 6,636,673 B2 | * 10/2003 | Register et al. | 385/105 |
| 2003/0113079 A1 | * 6/2003 | Storaasli | 385/111 |
| 2003/0118298 A1 | * 6/2003 | Matsuyama et al. | 385/110 |

FOREIGN PATENT DOCUMENTS

| | | |
|---|---|---|
| DE | 19852572 A1 | 5/2000 |
| DE | 10018380 A1 | 10/2001 |

* cited by examiner

Primary Examiner—James Hook
(74) Attorney, Agent, or Firm—Michael E. Carroll, Jr.

(57) ABSTRACT

An inner duct operable for routing a transmission cable therein includes a duct tube. The duct tube having an inner surface and an outer surface and at least one passageway disposed generally between said inner and outer surfaces of the duct tube. The at least one passageway being operable for receiving optical fibers therein. Alternative embodiments of the inner duct include at least one tube stranded therearound. The at least one tube includes at least one optical fiber therein and an outer sheath can generally surround the at least one tube.

35 Claims, 4 Drawing Sheets

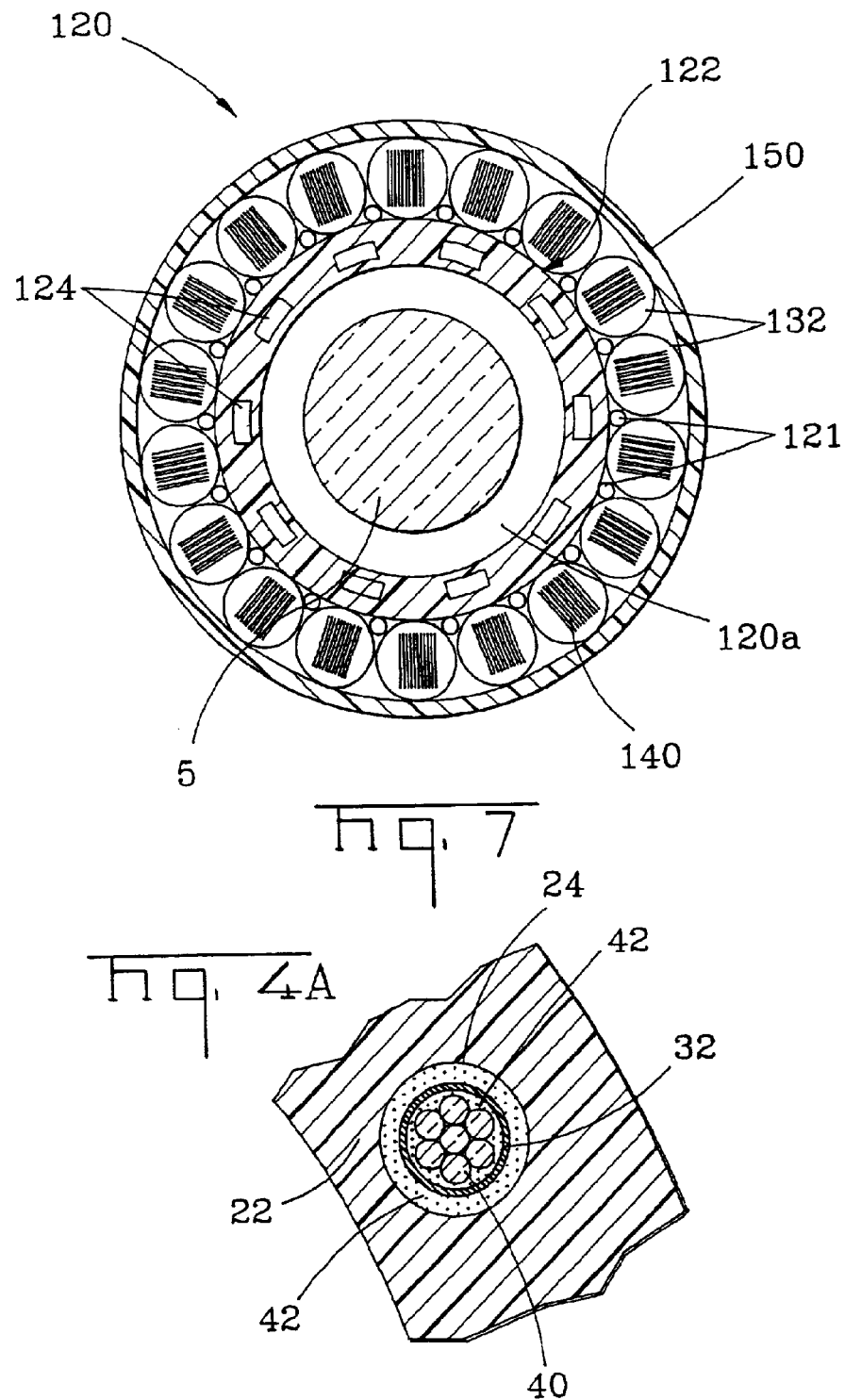

HIGH DENSITY FIBER OPTIC CABLE INNER DUCTS

FIELD OF THE INVENTION

The present invention relates to fiber optic cable inner ducts and, more particularly, to fiber optic cable inner ducts capable of having a high optical fiber density.

BACKGROUND OF THE INVENTION

Fiber optic cables include optical fibers that transmit signals, for example, voice, video, and/or data information. Generally, it is desirable for fiber optic cables to have a high optical fiber count and be as compact as possible, thereby maximizing optical fiber density while still maintaining optical performance. Likewise, when routing fiber optic cables, it is generally desirable to have a compact configuration while maintaining optical performance. For example, in urban environments, fiber optic cables may be routed within a duct. A conventional duct design uses a larger duct that acts as a conduit for routing a number of inner ducts therein. Each inner duct may contain a single fiber optic cable or a plurality of such cables routed within a central passage of the inner duct.

Shown in FIG. 1 is a conventional 4-inch duct 10 having three conventional inner ducts 13 routed therein. Inner ducts 13, which are solid cylindrical tubes, have respective central passages 13a and are arranged generally in a triangular fashion within duct 10. Duct 10 is a solid cylindrical tube; however, duct 10 may be a passage through, for example, concrete. The size of ducts and inner ducts are generally given in inches, while cable outer diameters are generally given in millimeters and that nomenclature will generally be used herein.

The use of inner duct 13 prevents a fiber optic cable 12 from being tangled with other fiber optic cables when routed within duct 10. Moreover, inner ducts 13 are used within duct 10 because they give telecommunication providers flexibility in routing, replacing, and/or upgrading fiber optic cables that are routed within inner ducts 13.

Flexibility allows the telecommunication provider, for example, to replace an old generation fiber optic cable within inner duct 13 with a next generation fiber optic cable. In this case, the telecommunication provider can attach the next generation cable to an end of the old generation cable and remove the old generation cable from the other end of inner duct 13. While the old cable is removed from inner duct 13, the new cable is pulled into inner duct 13. Additionally, the telecommunication provider may leave one, or more, of inner ducts 13 empty, thereby being able to increase the optical fiber density within duct 10 when the need arises at a later date. Moreover, this advantageously allows the telecommunication provider to defer capital expenditures until increased capacity is required.

However, the use of conventional inner ducts 13 within duct 10 creates unused space within duct 10, thereby limiting the fiber optic density of duct 10. For example as shown in FIG. 1, the shaded area represents an unused space WS between inner ducts 13 and duct 10 that is not utilized for routing fiber optic cables. Moreover, the cross-sectional area of both the inner duct 13 and duct 10 is also unused space because it is not be utilized to route optical fibers.

An optical fiber density of inner duct 13 can be calculated by dividing the number of optical fibers within inner duct 13 by the area enclosed by an outer diameter of inner duct 13. Hence, the fiber optic density of a fiber optic cable routed within conventional inner duct 13 limits the fiber optic density of conventional inner duct 13. For example, an inner duct 13 having an outer diameter of 1.5 inches may include a fiber optic cable having 864 optical fibers with an outer diameter of about 27 mm (about 1.06 inches) or less routed therein. For the given example, the fiber optic density of inner duct 13 is about 0.758 optical fibers per square millimeter.

Likewise, an optical fiber density of duct 10 can be calculated by dividing the number of optical fibers within duct 10 by the area enclosed by an outer diameter of duct 10. By way of example, each inner duct 13 may have a central-tube fiber optic cable having 864 optical fibers routed therein, giving duct 10 a total of 2,592 optical fibers routed therein. In this example, 2,592 optical fibers within the convention 4-inch duct yield an optical fiber density of about 0.320 fibers per square millimeter.

When inner ducts 13 are full and further capacity is required it is expensive, and may be difficult, for the telecommunications provider to route another duct 10. Therefore, it is advantageous to have high optical fiber density within duct 10 and inner ducts 13.

SUMMARY OF THE INVENTION

One aspect of the present invention is directed to an inner duct operable for routing a transmission cable therein, the inner duct including a duct tube, the duct tube having an inner surface and an outer surface, at least one passageway, the passageway disposed generally between the inner surface of the duct tube and the outer surface of the duct tube, wherein the passageway is operable for receiving at least one optical fiber.

Another aspect of the present invention is directed to an inner duct operable for routing a transmission cable therein, the inner duct including a duct tube, the duct tube having an inner surface and an outer surface, at least one tube, the at least one tube being stranded around the duct tube, and at least optical fiber, the optical fiber being disposed in the at least one tube.

A further aspect of the present invention is directed to an inner duct operable for routing a transmission cable therein, the inner duct including a duct tube, the duct tube having an inner surface and an outer surface, at least one passageway, the passageway disposed generally between the inner surface of the duct tube and the outer surface of the duct tube, wherein the passageway is operable for receiving at least one optical fiber, at least one tube, wherein the at least one tube is stranded around the duct tube, at least one optical fiber, the at least one optical fiber being disposed in the at least one tube, and an outer sheath, the outer sheath generally surrounding the at least one tube.

BRIEF DESCRIPTION OF THE FIGS.

FIG. 4a is a sectional view of a portion of the inner duct of FIG. 4.

FIG. 7 is a cross-sectional view of another inner duct according to the present invention.

DETAILED DESCRIPTION OF THE INVENTION

Figure 1:
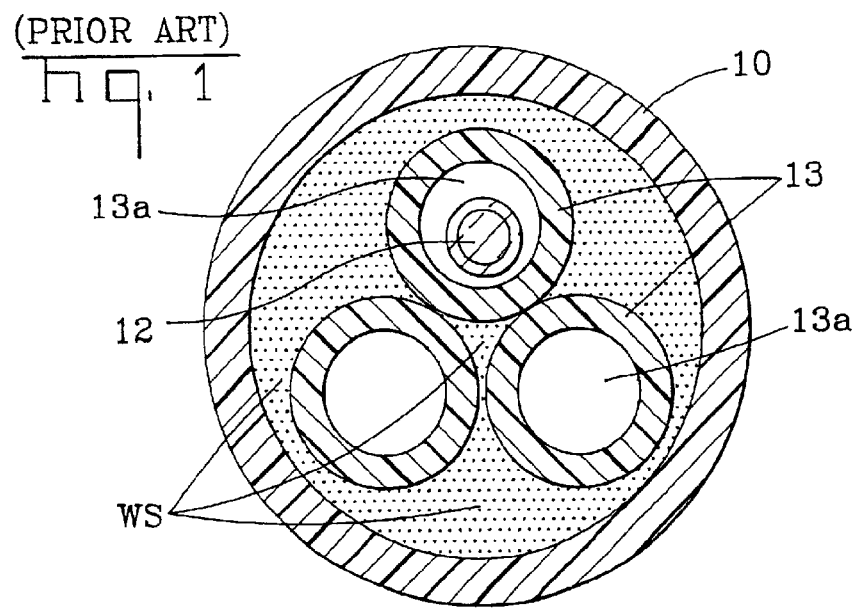
FIG. 1 is a cross-sectional view of a conventional prior art duct having conventional inner ducts routed therein.
Figure 2:
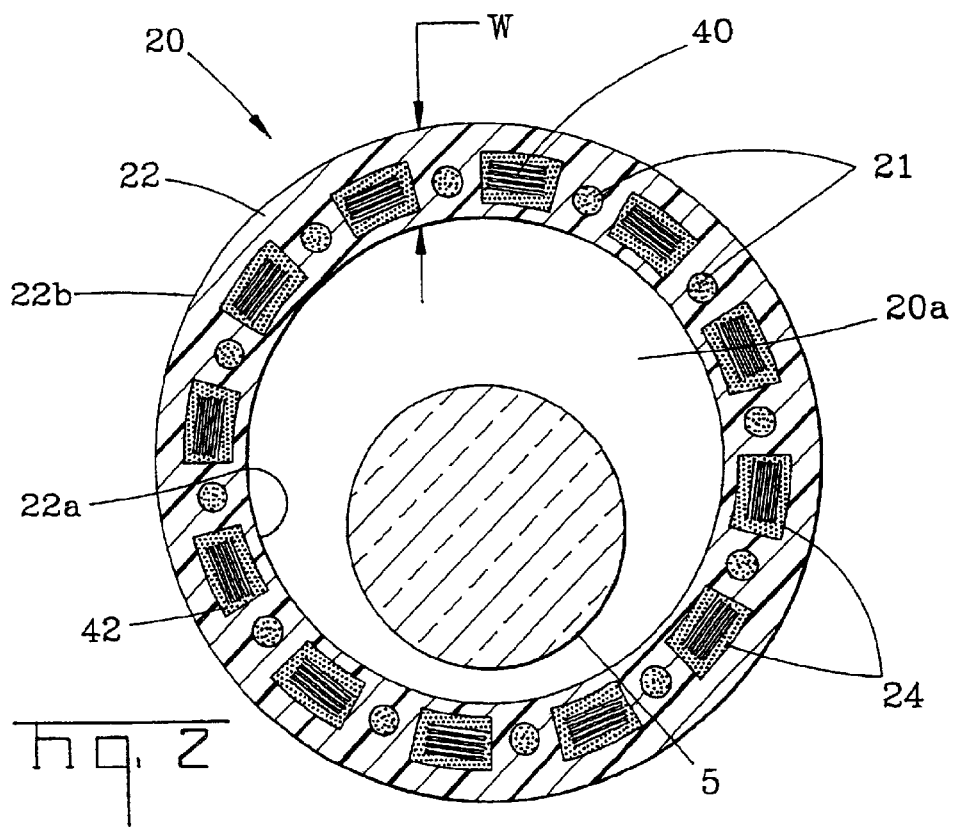
FIG. 2 is a cross-sectional view of an inner duct according to the present invention.

FIG. 2 depicts an inner duct 20 according to one embodiment the present invention. Inner duct 20 is typically routed within a larger duct; however, inner duct 20 may be used in other applications. Inner duct 20 includes a central passage 20a operable for routing at least one transmission cable 5 therein. Transmission cable 5, for example, a fiber optic cable, is capable of transmitting signals; however, other suitable transmission cables may be routed within inner duct 20, for example, a copper conductor transmission cable.

Inner duct 20 includes a duct tube 22 having an inner surface 22a and an outer surface 22b. Disposed generally between inner surface 22a and outer surface 22b of duct tube 22 is at least one passageway 24. Passageway 24 is operable for receiving, for example, electrical conductors and/or at least one optical fiber 40 therein. At least one optical fiber 40 may be loose, bundled, or configured in an optical fiber ribbon; however, other suitable light waveguides may be routed within passageway 24. Passageway(s) 24 can generally increase the optical fiber density of inner duct 20 by utilizing space that was unused by conventional inner duct 13.

Duct tube 22 is manufactured from polymeric-based materials as known to one of ordinary skill in the art; however, other suitable materials may be used. Suitable polymeric-based materials may include, for example, a polyvinyl chloride (PVC) or a high-density polyethylene (HDPE). Materials used for duct tube 22 are generally harder than materials used for a typical cable jacket. For example, a Shore D hardness of a PVC material for duct tube 22 may have a range of about 50 or more, and preferably a Shore D hardness of about 60 or more. By way of example, a HDPE material may have a Shore D hardness of about 70 or more. Whereas a medium-density polyethylene (MDPE) used for a cable jacket, for example, has a Shore D hardness of 50. However, duct tube 22 is flexible enough to allow routing of inner duct 20 within a duct. Other types of materials may also be used such as flame retardant polymeric-based materials. Duct tube 22 is generally monolithic; however, other embodiments may include other suitable construction configurations. As used herein, monolithic means constructed of one or more materials that form a single component after extrusion.

Duct tube 22 may also include at least one marking indicia (not shown). Marking indicia may take the form of a stripe, a groove, or other suitable indicia. Marking indicia allows the craftsman to identify a first passageway 24 and identify the other passageways 24 therefrom, for example, in a clockwise manner from the first passageway 24. However, other suitable methods can be used to identify passageways 24.

Duct tube 22 may also include at least one strength member 21 disposed between inner and outer surfaces 22a and 22b. Strength member 21 provides structural integrity to duct tube 22, for example, tensile strength, and/or anti-buckling strength. Strength member 21 may be, for example, yarns or fibers such as aramid or fiberglass, and/or metal wires such as steel or copper; however, other suitable strength members 21 may be used. Duct tube 22 can be manufactured, for example, by feeding strength member 21 into a cross-head extruder, during the extrusion process of duct tube 22, to position strength member 21 between inner and outer surfaces 22a and 22b of duct tube 22.

Strength members 21 may be generally equally spaced around duct tube 22 imparting a generally non-preferential bend characteristic to duct tube 22; however, strength members may be unequally spaced imparting a preferential bend characteristic to duct tube 22.

Duct tube 22 has a generally round cross-sectional shape; however, other suitable cross-sectional shapes may be employed, for example, rectangular or oval. In one embodiment suitable for routing within a 4-inch duct, duct tube 22 has an inner diameter of about 1.25 inches, an outer diameter of about 1.5 inches, and a wall thickness w of about 0.25 inches with aramid fibers therein. However, embodiments of the present invention may be practiced with other suitable inner diameters, outer diameters, strength members, and/or wall thickness w. Wall thickness w and/or strength member (s) 21 are suitable to provide the necessary structural integrity, such as, tensile strength, crush resistance and/or anti-buckling to duct tube 22.

Passageway 24 of duct tube 22 may have various suitable sizes and/or shapes. For example, a duct tube 22 suitable for routing within a 4-inch duct has at least one passageway 24 defined by two generally curved radially spaced walls and two end walls. The generally curved walls define a width of passageway 24, about 3 mm, and the end walls define a length of passageway 24, about 4 mm; however, other suitable passageway dimensions and/or shapes may be used. Passageway 24 is formed in duct tube 22, for example, using an extrusion process having suitable dies as is known to one of ordinary skill in the art. A homogeneous material generally forms passageway 24; however, in other embodiments more than one material may form passageway 24. In preferred embodiments, passageways 24 are generally symmetrically disposed within and around duct tube 22; however, other embodiments of the present invention may have non-symmetrical configurations of passageways 24 as discussed herein. Moreover, passageway 24 may be disposed within duct tube 22 longitudinally, helically, or in other suitable configurations with respect to the longitudinal axis of duct tube 22. In the embodiment shown in FIG. 2, twelve passageways 24 having a generally rectangular shape are longitudinally disposed and generally equally spaced around duct tube 22; however, other suitable number of passageways may be used. Each generally rectangular passageway 24 has a suitable size and shape for receiving a stack of optical fiber ribbons therein. For example, six optical fiber ribbons, each ribbon having twelve optical fibers 40 for a total of seventy-two optical fibers per passageway 24, and a total of eight-hundred and sixty-four optical fibers within passageways 24. Optical fiber ribbons may be fed into a cross-head extruder during the manufacture of duct tube 22, or they may be blown into passageways 24 at a later date. Blowing optical fibers 40 into passageways 24 at a later date advantageously allows the telecommunication provider to avoid the expense of optical fibers until capacity is required.

If optical fibers 40 are fed into the cross-head extruder during the manufacturing process, an interfacial layer 42 is desirable. Interfacial layer 42 may include soft thermoplastic elastomers, aramid fibers, greases, gels, foams, talc powder, water-blocking compounds such as tapes, yarns and/or powders or other suitable materials. Interfacial layer 42, for example, inhibits optical fibers 40 from sticking to passageway 24, thereby preserving optical performance. Moreover, interfacial layer 42 is preferably operable to decouple optical fiber component 11 from passageway 24, for example, during bending. Interfacial layer 42 is preferably disposed adjacent to optical fibers 40 and, more preferably, disposed between optical fibers 40 and passageway 24.

Inner duct 20 is advantageous because, for example, it is operable to further increase the fiber optic density compared with conventional inner duct 13. Moreover, inner duct 20 is operable to increase the fiber optic density of a duct. In other words, inner ducts of the present invention are capable of having a fiber optic density greater than zero without a transmission cable or an optical fiber routed within the central passage. Whereas, conventional inner ducts 13 have fiber optic density capacity of zero without, for example, a transmission cable being routed within central passage 13*a*. For example, an inner duct 20 having an outer diameter of about 1.5 inches according to the present invention, without a transmission cable within central passage 20*a*, is capable of having about eight-hundred and sixty-four optical fibers 40 routed within passageways 24. Consequently, inner duct 20 is capable of having a fiber optic density of about 0.758 optical fibers per square millimeter. Moreover, routing a fiber optic cable 5 therein further increases the optical fiber density of inner duct 20. By way of example, when an eight-hundred and sixty-four fiber optical cable 5 is routed within inner duct 20 the total optic fiber count of increases to one-thousand seven-hundred and twenty-eight optical fibers, thereby increasing the optical fiber density of inner duct 20 to about 1.516 optical fibers per square millimeter. Three such inner ducts would provide five-thousand one-hundred and eighty-four optical fibers when routed within a conventional 4-inch duct, thereby increasing the optical fiber density to about 0.641 optical fibers per square millimeter.

Figure 3:
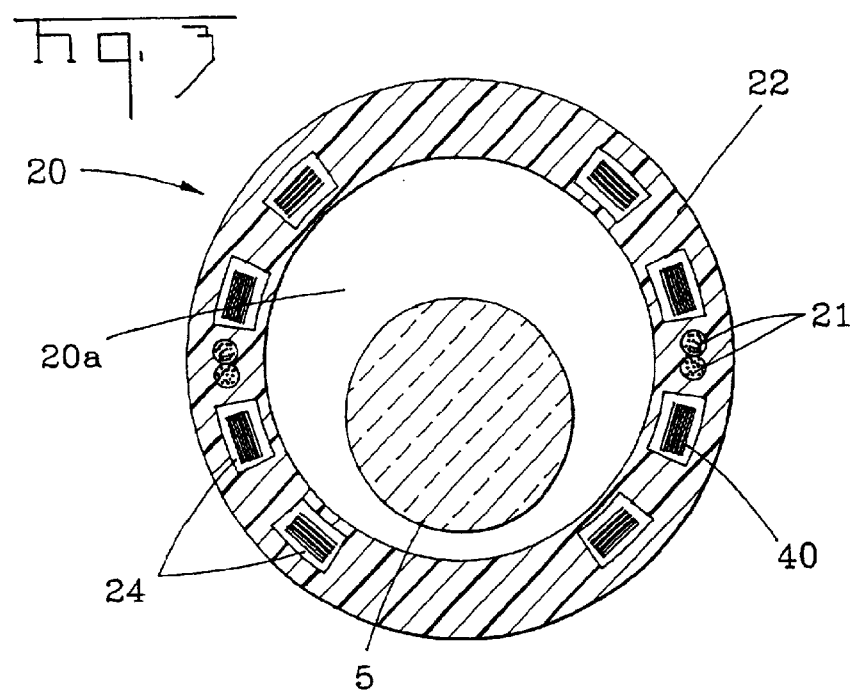
FIG. 3 is a cross-sectional view of another inner duct according to the present invention.

A further advantage of inner duct 20 is that it provides the telecommunication provider flexibility in designing an upgradeable network. However, inner duct 20 can take other forms while still providing these same advantages. As shown in FIG. 3, for example, another embodiment of the present invention includes strength members 21 positioned to impart a preferential bend characteristic to inner duct 22. During installation, the preferential bend characteristic of inner duct 20 of FIG. 3 preferably directs the abrasion against portions of outer surface 22*b* of inner duct 22 that do not have optical fibers 40 adjacent thereto.

Figure 4:
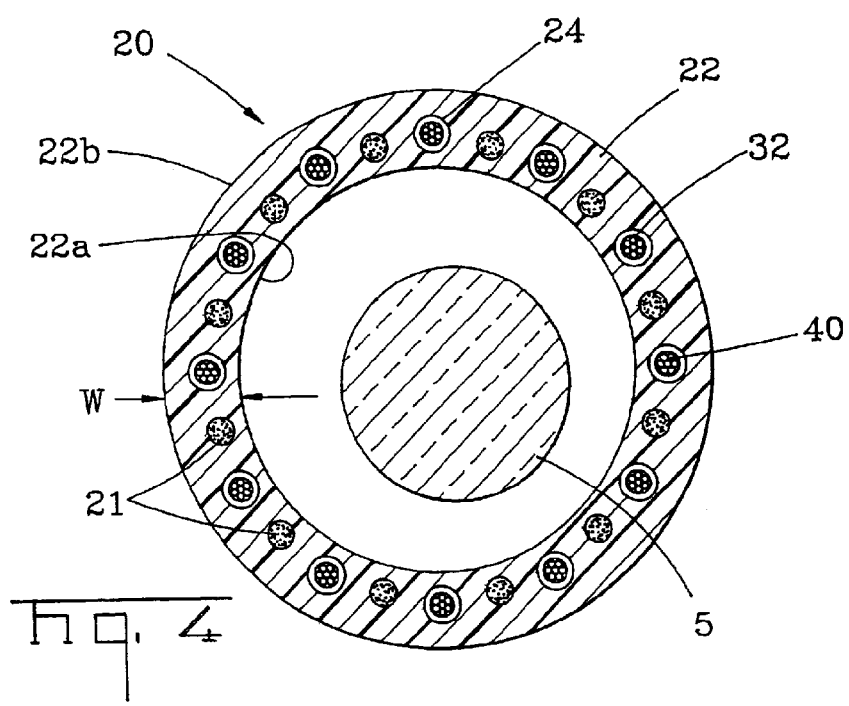
FIG. 4 is a cross-sectional view of another inner duct according to the present invention.

As shown in FIG. 4, yet another embodiment of present invention includes at least one passageway 24 with a generally round shape. Passageway 24 of FIG. 4 is suitable for receiving, for example, a tube 32 having optical fibers 40 therein, or passageway 24 may have optical fibers 40 blown in at a later date. Tubes 32 may be formed from any suitable dielectric, conductive, or semi-conductive material. Tubes 32 may, for example, be fed into a cross-head extruder during the manufacture of duct tube 22. Additionally, interfacial layer 42 may be disposed generally between optical fiber(s) 40 and tube 32 and/or tube 32 and passageway 24 (FIG. 4*a*).

Inner ducts 20 of the present invention are generally operable to be pulled into a larger duct and have a transmission cable pulled into, or out of, inner duct 20; however, inner ducts 20 may be used in other configurations. Relatively high forces are required to pull the transmission cable through inner duct 20. Likewise, relatively high forces are required to pull inner duct 20 within a duct. It is generally desirable to prevent damage to the transmission cable and/or inner duct during installation. Therefore, it is advantageous to lower the coefficient of friction, for example, between the transmission cable and inner surface 22*a* of duct tube 22. Consequently, by lowering the coefficient of friction, the installation force required to pull the transmission cable through inner duct 20 is lowered. Moreover, a relatively lower installation force advantageously allows longer lengths of transmission cable to be strung without a relay.

Figure 5:
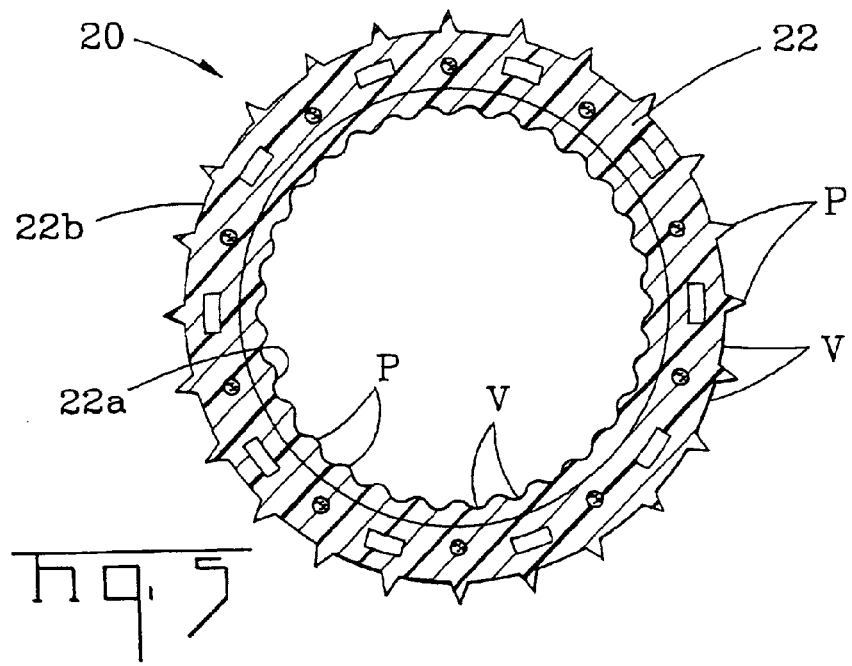
FIG. 5 is a cross-sectional view of a yet another inner duct according to the present invention.

FIG. 5 depicts another embodiment of the present invention where duct tube 22 includes ribs 26. Ribs 26 are formed by a plurality of peaks P and valleys V along inner and/or outer surfaces 22*a* and 22*b* of duct tube 22. Ribs 26 are operable for reducing friction forces by reducing the contact area on the surface of duct tube 22. For example, only peaks P formed on inner surface 22*a* of duct tube 22 contact the transmission cable being pulled through duct tube 22. Since peaks P have a smaller contact area relative to a contact area of a smooth surface, the friction force on the transmission cable is substantially reduced. Ribs 26 may be disposed on inner surface 22*a* and/or outer surface 22*b* of duct tube 22 to reduce the friction force required to pull-in, or pull-out, the transmission cable and/or inner duct 20 into a predetermined position. Moreover, peak P and valleys V of ribs 26 may have any suitable shape, for example, round, flat, and/or pointed. Additionally, a lubricant can be used when installing the transmission cable and/or inner duct 20. Valleys V between ribs 26 can advantageously act as a reservoir for a lubricant that also reduces the coefficient of friction.

Ribs 26 are preferably orientated in a spiral configuration to inhibit damage to a jacket of the transmission cable being pulled therein. More specifically, spiral ribs 26 inhibit shaving the jacket off of the transmission cable because the transmission cable tends to pass over the spiral ribs 26 in a generally transverse manner. As used herein, the term "spiral" is meant to define ribs that extend in the transverse and longitudinal direction relative to duct tube 22. The term spiral is not limited to a helix or a single frequency, direction, angle, spacing, size, or ribs that are continuous. However, ribs 26 may have other suitable configurations such as a generally longitudinal orientation, or a reversing spiral configuration. The benefit of the reversing spiral configuration is that, for example, the transmission cable passed through duct tube 22 may not have a tendency to rotate with the spiral.

Rib height H can have a range from about 0.005 inches to about 0.150 inches or more, with the preferred height H being about 0.015 inches. Rib spacing S can have a range from about 0.025 inches to about 0.500 inches or more, with the preferred spacing S being about 0.125 inches. The frequency of the spiral configuration can range between about 10 revolutions per foot and about 0.05 revolutions per foot, with a preferred frequency of about 0.33 revolutions per foot, or about one revolution every three feet. However, rib height, rib spacing, and/or frequency may be varied depending on the size of inner duct 20. The direction of spiral rotation can be altered in a periodic fashion to create a sinusoidal wave, as well, without diminishing the desired effect.

Figure 6:
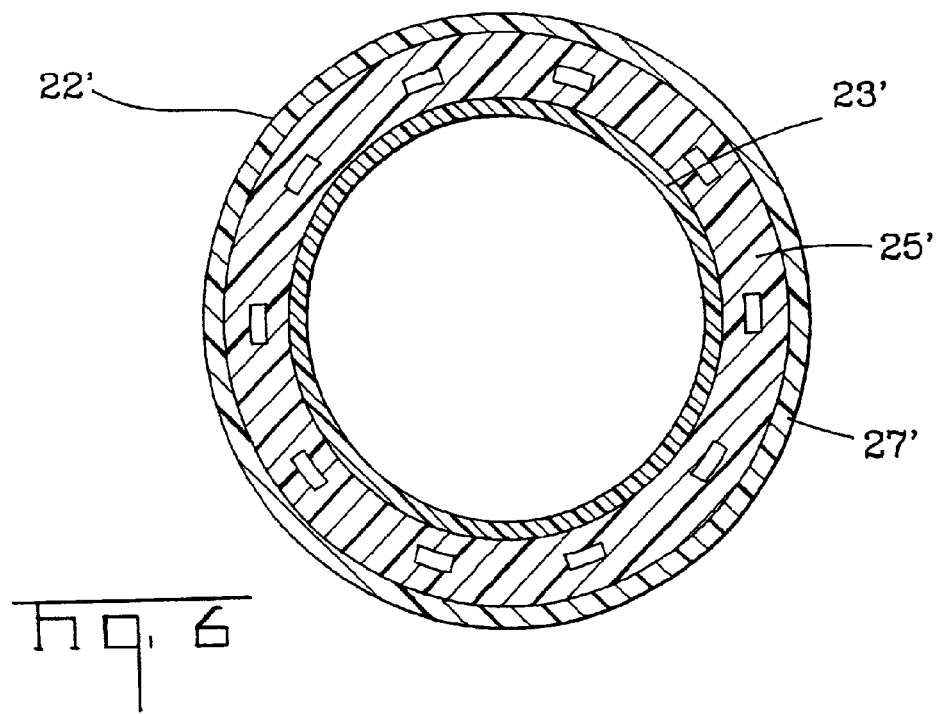
FIG. 6 is a cross-sectional view of still another inner duct according to the present invention.

FIG. 6 depicts yet another embodiment of the present invention where duct tube 22 is formed by co-extruding two or more materials to form a multi-layered monolithic duct tube 22'. For example, duct tube 22' may include a first layer 23' and a second layer 25' formed from materials having different characteristics and/or properties. For example, first layer 23' may include an additive, for example, a material impregnated with a lubricating agent. Consequently, a lower coefficient of friction results between objects in contact with first layer 23' of duct tube 22', for example, a transmission cable. Of course, other objects may be in contact with first layer 23' of duct tube 22' such as, but not limited to, pull lines and the like.

Suitable materials for first layer 23' are, for example, Teflon®, silicone impregnated polyethylene, graphite impregnated polyethylene, or other suitable polymeric materials having lubricating agents therein. By way of example, first layer 23' is formed from a silicone impregnated polyethylene where the concentration of silicone in relation to polyethylene is between about 0.01% and about 20% by weight; however, other suitable concentrations may be used. Furthermore, should the interior surface of first layer 23' be worn, for example, from pulling the transmission cable(s) and/or the winch line used to place the same, the wear will only expose further lubricated material of first layer 23'. Hence, first layer 23' of duct tube 22' is permanently lubricated. Second layer 25' is formed, for example, from a high tensile strength polymer such as a high-density polyethylene (HDPE); however, other suitable materials may be used as described herein.

In another embodiment of the present invention, a third layer 27' is generally disposed around second layer 25' of duct tube 22'. Third layer 27' may include pigments, stabilizers, lubricants, and/or other suitable additives. The addition of third layer 27' enables second layer 25' to be formed free of pigments, stabilizers, and/or other suitable additives. Thus, multilayered duct tubes 22' formed according to the present invention exhibit multiple material characteristics, for example, a high tensile strength due to second layer 25' as well as a lubricated first layer 23' to aid in pulling the transmission cable through duct tube 22'. Additionally, first layer 23', second layer 25', and/or third layer 27' may include ribs, strength members, additives, or other suitable components and/or features as described herein. Furthermore, embodiments of the present invention may include other suitable layers, both in numbers of layers and/or materials, to form a multi-layered duct tube.

FIG. 7 illustrates inner duct 120, which is another embodiment according to the present invention operable for routing at least one transmission cable within a central passage 120*a*. Inner duct 120 is suitable for routing, for example, in a larger duct. By way of example, the construction and dimensions of components of an inner duct 120 suitable for routing within a 4-inch duct will be described herein. However, the inventive concepts of the present invention are applicable to other suitable configurations of inner duct 120 and/or other suitable sizes of inner duct 120. Moreover, embodiments of inner duct 120 may be used without a duct.

Inner duct 120 includes a duct tube 122 having at least one strength member 121 and at least one tube 132 stranded therearound. Tubes 132 have optical fibers 140 therein. An outer sheath 150 generally surrounds duct tube 122, tubes 132 and strength members 121. Duct tube 122 is generally concentric with outer sheath 150 of duct 120; however, other suitable configurations are possible. For example, duct tube 122 may have other suitable inner ducts routed therein, which may be concentrically or non-concentrically disposed therein. For example, a smaller duct tube may be generally concentric with duct tube 122 with a layer of stranded tubes, having optical fibers therein, disposed therebetween.

As shown, duct tube 122 is generally a solid tube; however, duct tube 122 may incorporate features of duct tubes as described herein, for example, passageways 124, strength members, ribs, and/or multi-layered construction. In one embodiment, duct tube 122 has an outer diameter of about 48 mm (about 1.9 inches) and an inner diameter of about 38 mm (about 1.5 inches); however, other suitable shapes and/or dimensions may be used. Duct tube 122 has a relatively larger inner diameter compared with conventional inner ducts, thereby allowing a relatively larger transmission cable to be routed therein. For instance, a fiber optic cable having 1728 optical fibers may be routed within central passage 120*a*. Such a fiber optic cable known as an ALTOS® cable, which has an outer diameter of about 31 mm (about 1.22 inches), is available from Corning Cable Systems LLC of Hickory, N.C. However, other suitable transmission cables may be routed within duct tube 122.

Optical fibers 140 disposed within tubes 132 can be configured as a stack of optical fiber ribbons to increase the optical fiber density within tubes 132; however, other suitable configurations of optical fibers may be used. Moreover, the stacks of optical fiber ribbons may be arranged within tubes 132 as disclosed in U.S. Pat. No. 6,192,178 and/or U.S. patent application Ser. No. 09/789,048 filed Feb. 19, 2001, both of which are incorporated herein by reference. Tubes 132 may be formed from suitable polymeric-based materials as known to one of ordinary skill in the art.

As depicted in FIG. 7, eighteen tubes 132 are stranded around duct tube 122. In one embodiment, tube 132 has an outer diameter of about 10.5 mm (about 0.41 inches) and an inner diameter of about 9.0 mm (about 0.35 inches); however, tubes 132 having other suitable dimensions may be used. Disposed within each tube are eighteen optical fiber ribbons, each ribbon having twelve optical fibers for a total of 216 optical fibers within in each tube 132. Thus, the eighteen tubes 132 contain a total of 3,888 optical fibers therein. Of course, other optical fiber counts may be used within each tube 132 and/or the number of tubes may vary. For example, a filler rod may be used in place of tube 132.

Strength member 121 is a glass-reinforced plastic rod; however, other suitable strength members may be used, for example, aramid fibers, glass fibers and/or metal wires. Additionally, other embodiments of inner duct 120 may include other suitable components, for example, water-blocking tapes, yarns and/or materials, binder threads, other tubes and/or other suitable components. Moreover, the manufacturing process can be accomplished in one or more manufacturing steps. By way of example, a manufacturing process may include extruding duct tube 122 and stranding tubes 132 and strength members therearound. Additionally, a water-blocking tape can surround tubes 132 or a water-blocking yarn can be stranded with tubes 132. A larger water-blocking tape may also be generally disposed around stranded tubes 132 being secured by binder threads to form a core of inner duct 120. Aramid fibers are then stranded around the core of inner duct 120 before outer sheath 150 is extruded thereover.

Outer sheath 150 generally surrounds and protects tubes 132 and/or other components. For example, during installation an outer surface of outer sheath 150 protects tubes 132 and/or other components from contacting an inner surface of a duct. Outer sheath 150 may be constructed from suitable polymeric materials as known to one of ordinary skill in the art. Outer sheath 150 has an outer diameter of about 82 mm (about 3.23 inches) and an inner diameter of about 69 mm (about 2.72 inches). In other embodiments, strength members 121 may be disposed generally between an inner and outer surface of outer sheath 150.

The embodiment of inner duct 120 described herein contains 3,888 optical fibers 140 within tubes 132. This yields an optical fiber density of about 0.481 optical fibers per square millimeter within a 4-inch duct. This is a significant increase of the optical fiber density of a conventional 4-inch duct, which is 0.320 optical fibers per square millimeter. Additionally, a 1,728 optical fiber count transmission cable may be routed within duct tube 122. This further increases the total optical fiber count of inner duct to 5,616 optical fibers. Thus, the optical fiber density of inner duct 120 is capable of being dramatically increased to about 0.694 optical fibers per square millimeter. Moreover, in other embodiments of the present invention the optical fiber density can be further increased by, for example, using a transmission cable with more optical fibers, increasing the number of optical fibers within tubes 132, and/or including passageways within duct tube 122 operable for routing optical fibers therein. Additionally, this ability to increase the optical fiber density at a later date allows the telecommunication provider flexibility in designing an upgradeable network.

In view of the present disclosure, many modifications and other embodiments of the present invention, within the scope of the appended claims, will become apparent to a skilled artisan. For example, the outer sheath 150 of inner duct 120 of FIG. 7 can incorporate passageways, ribs, and/or multi-layered construction as disclosed herein. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been described with reference to inner ducts, but the inventive concepts of the present invention are applicable to other suitable conduits for routing cables as well.

That which is claimed:

1. An inner duct having a central passage operable for routing a transmission cable therein, said inner duct comprising:
   a duct tube, said duct tube being monolithic and having an inner surface and an outer surface defining a duct tube wall therebetween, said inner surface defining the central passage, the central passage being sized for installing and removing the transmission cable, wherein an average outer diameter of the duct tube is about 38 millimeters (1.5 inches) or less so that the inner duct is suitable for routing a plurality of inner ducts within a larger duct;
   at least one passageway, said passageway disposed generally between said inner surface of said duct tube and said outer surface of said duct tube so that the at least one passageway is disposed within the duct tube wall, wherein said passageway is operable for receiving at least one optical fiber.

2. The inner duct according to claim 1, said duct further comprising at least one strength member disposed between said inner surface of said duct tube and said outer surface of said duct tube.

3. The inner duct according to claim 1, said passageway of said inner duct having at least one optical fiber disposed therein.

4. The inner duct according to claim 1, said inner duct further comprising at least one tube stranded around said duct tube.

5. The inner duct according to claim 4, said at least one tube having an outer sheath therearound.

6. The inner duct according to claim 5, said duct tube being generally concentric with said outer sheath.

7. The inner duct according to claim 4, the at least one tube being in contact with said inner duct.

8. The inner duct according to claim 1, said inner duct further comprising a transmission cable within the central passage.

9. The inner duct according to claim 1, said duct tube further comprising ribs.

10. The inner duct according to claim 1, said duct tube further comprising at least two layers.

11. The inner duct according to claim 10, said at least one of said layers of having a lubricant.

12. The inner duct according to claim 1, said inner duct having a fiber optic density greater than zero when a central passage of said duct tube is empty.

13. The inner duct according to claim 1, the inner surface being generally round thereby forming an average inner diameter of about 32 millimeters (1.25 inches).

14. The inner duct according to claim 1, the at least one passageway having a cross-sectional area of about 10 square millimeters.

15. The inner duct according to claim 1, the central passage having a cross-sectional area that comprises the majority of a total cross-sectional area of said inner duct.

16. An inner duct having a central passage operable for routing a transmission cable therein and removing the transmission cable therefrom, said inner duct comprising:
   a duct tube, said duct tube being monolithic and having an inner surface and an outer surface defining a duct tube wall therebetween, wherein the central passage has a cross-sectional area that comprises the majority of a total cross-sectional area of the inner duct;
   at least one tube, said at least one tube being stranded around said duct tube; and
   at least optical fiber, said optical fiber being disposed in the at least one tube.

17. The inner duct according to claim 16, said inner duct further comprising an outer sheath generally surrounding said at least one tube.

18. The inner duct according to claim 17, said duct tube being generally concentric with said outer sheath.

19. The inner duct according to claim 16, said inner duct further comprising at least one passageway, said at least one passageway being disposed generally between said inner surface of said duct tube and said outer surface of said duct tube, wherein said passageway is operable for receiving at least one optical fiber.

20. The inner duct according to claim 19, said at least one passageway having at least one optical fiber disposed therein.

21. The inner duct according to claim 16, said inner duct further comprising at least one strength member disposed between said inner surface of said duct tube and said outer surface of said duct tube.

22. The inner duct according to claim 16, said inner duct further comprising an optical fiber cable disposed within the central passage.

23. The inner duct according to claim 16, said duct tube further comprising ribs.

24. The inner duct according to claim 16, said outer sheath further comprising ribs.

25. The inner duct according to claim 16, said duct tube further comprising at least two layers.

26. The inner duct according to claim 25, said at least one of said layers of having a lubricant.

27. The inner duct according to claim 25, said outer sheath having a lubricant.

28. The inner duct according to claim 16, said inner duct having a fiber optic density greater than zero when a central passage of said duct tube is empty.

29. The inner duct according to claim 16, a ratio of the cross-sectional area of the central passage to the total cross-sectional area of said inner duct being about 0.7.

30. An inner duct having a central passage operable for routing a transmission cable therein, said inner duct comprising:

a duct tube, said duct tube being monolithic and having an inner surface and an outer surface defining a duct tube wall therebetween, said inner surface defining the central passage, the central passage being sized for installing and removing the transmission cable;

at least one passageway, said passageway disposed generally within said duct tube wall, wherein said passageway is operable for receiving at least one optical fiber;

at least one tube, wherein said at least one tube is stranded around said duct tube;

at least one optical fiber, said at least one optical fiber being disposed in said at least one tube; and an outer sheath, said outer sheath generally surrounding said at least one tube.

31. The inner duct according to claim 30, said duct tube further comprising ribs.

32. The inner duct according to claim 30, said duct tube further comprising at least two layers.

33. The inner duct according to claim 30, said at least one of said layers of having a lubricant.

34. The inner duct according to claim 30, said inner duct having a fiber optic density greater than zero when a central passage of said duct tube is empty.

35. The inner duct according to claim 30, said outer sheath further comprising ribs.

* * * * *